(12) United States Patent
Padmanabhan

(10) Patent No.: US 7,972,707 B2
(45) Date of Patent: *Jul. 5, 2011

(54) TRAILER FLOORING WITH HOTMELT COATING

(75) Inventor: Gopalkrishna Padmanabhan, Fenton, MO (US)

(73) Assignee: Havco Wood Products, LLC., Scott City, MO (US)

( * ) Notice: Subject to any disclaimer, the term of this patent is extended or adjusted under 35 U.S.C. 154(b) by 970 days.

This patent is subject to a terminal disclaimer.

(21) Appl. No.: 10/932,519

(22) Filed: Sep. 2, 2004

(65) Prior Publication Data

US 2005/0266200 A1 Dec. 1, 2005

Related U.S. Application Data

(60) Provisional application No. 60/500,195, filed on Sep. 4, 2003.

(51) Int. Cl.
*B32B 5/66* (2006.01)
(52) U.S. Cl. .......... 428/537.1; 428/413; 428/479.6; 428/511; 428/528
(58) Field of Classification Search .......... 428/537.1, 428/425, 532, 528, 413, 511, 479.6, 507, 428/225, 228, 227, 232, 298.1, 299.1, 54
See application file for complete search history.

(56) References Cited

U.S. PATENT DOCUMENTS

| | | | |
|---|---|---|---|
| 2,537,343 A | 1/1951 | Golick et al. | 428/478.4 |
| 2,588,580 A | 3/1952 | Scruggs | 156/291 |
| 3,037,900 A | 6/1962 | Hings et al. | 156/310 |
| 3,315,380 A | 4/1967 | Mack, III et al. | 36/19.5 |
| 3,681,883 A | 8/1972 | Ehrlich | 52/220 |
| 3,751,864 A | 8/1973 | Berger et al. | 52/79 |
| 3,848,284 A | 11/1974 | Livingston | 9/6 |
| 4,083,743 A | 4/1978 | Degens | 156/278 |
| 4,158,712 A | 6/1979 | Degens | 428/212 |
| 4,158,713 A | 6/1979 | Degens | 428/212 |
| 4,180,413 A | 12/1979 | Diederich | 156/185 |
| 4,188,445 A | 2/1980 | Hill | 428/246 |
| 4,288,957 A | 9/1981 | Meehan | 52/460 |
| 4,307,883 A | 12/1981 | Kelly | 273/51 |
| 4,378,402 A | 3/1983 | Below | 428/247 |
| 4,443,520 A | 4/1984 | Braithwaite | 428/438 |
| 4,489,121 A | 12/1984 | Luckanuck | 428/192 |
| 4,500,387 A | 2/1985 | Embury | 156/499 |
| 4,526,418 A | 7/1985 | Martin | 296/182 |
| 4,528,231 A | 7/1985 | Lund | 428/148 |
| 4,620,892 A | 11/1986 | Dodson et al. | 156/319 |
| 4,674,745 A | 6/1987 | Speranza | 273/51 |
| 4,706,424 A | 11/1987 | Garapick et al. | 52/181 |
| 4,735,851 A | 4/1988 | Dodson et al. | 428/326 |
| 4,801,483 A | 1/1989 | Beckerman et al. | 428/71 |
| 4,904,328 A | 2/1990 | Beecher et al. | 156/272.2 |
| 4,913,485 A | 4/1990 | Moffatt et al. | 296/190 |
| 4,938,265 A | 7/1990 | Mountz | 144/347 |
| 5,054,843 A | 10/1991 | Gray | 296/191 |
| 5,055,156 A | 10/1991 | Marino et al. | 156/499 |
| 5,059,472 A | 10/1991 | Le Bell et al. | 428/161 |
| 5,106,446 A | 4/1992 | Beck et al. | 156/331.7 |
| 5,135,598 A | 8/1992 | Kobe et al. | 156/273.3 |
| 5,135,793 A | 8/1992 | Socha | 428/74 |
| 5,143,418 A | 9/1992 | Fouquet | 296/182 |
| 5,153,058 A | 10/1992 | Hall et al. | 428/319.7 |
| 5,166,302 A | 11/1992 | Werner et al. | 528/67 |
| 5,190,607 A | 3/1993 | Werner et al. | 156/331.1 |
| 5,362,545 A | 11/1994 | Tingley | 428/96 |
| 5,407,517 A | 4/1995 | Hänsel et al. | 156/331.7 |
| 5,498,460 A | 3/1996 | Tingley | 428/96 |
| 5,501,054 A | 3/1996 | Soltis et al. | 52/730.7 |
| 5,509,715 A | 4/1996 | Scharpf | 296/181 |
| 5,599,895 A | 2/1997 | Heider | 528/59 |
| 5,603,798 A | 2/1997 | Bhat | 156/331.4 |
| 5,710,215 A | 1/1998 | Abend | 525/124 |
| 5,776,406 A | 7/1998 | Schubert et al. | 264/328.1 |
| 5,827,393 A | 10/1998 | Kinzelmann et al. | 156/308.2 |
| 5,866,656 A | 2/1999 | Hung et al. | 525/123 |
| 5,928,735 A | 7/1999 | Padmanabhan et al. | 428/33 |
| 6,136,408 A * | 10/2000 | Radcliffe et al. | 428/107 |
| 6,179,942 B1 * | 1/2001 | Padmanabhan | 156/153 |
| 6,182,413 B1 * | 2/2001 | Magnusson | 52/589.1 |
| 6,183,824 B1 * | 2/2001 | Padmanabhan et al. | 428/33 |
| 6,479,127 B1 * | 11/2002 | Kornicer et al. | 428/105 |
| 6,558,765 B2 * | 5/2003 | Padmanabhan | 428/54 |
| 6,558,766 B2 * | 5/2003 | Padmanabhan et al. | 428/54 |
| 6,641,629 B2 * | 11/2003 | Safta et al. | 51/298 |
| 6,949,160 B2 * | 9/2005 | Weiss et al. | 156/247 |
| 7,131,242 B2 * | 11/2006 | Martensson et al. | 52/591.3 |

FOREIGN PATENT DOCUMENTS

JP 6-280375 10/1994

OTHER PUBLICATIONS

"Prestressed FRP Sheets As External Reinforcement of Wood Members" by Thanasis C. Triantafillour and Nikola Deskovic, Journal of Structural Engineering, vol. 118, No. 5, May 1992, pp. 1270-1284.

"A Feasabillity Study for Strengthening Timber Beams With Fibreglass" by F.H. Theakston, Canadian Agricultural Engineerings, Jan. 1965, pp. 17-19.

\* cited by examiner

*Primary Examiner* — Leszek Kiliman

(74) *Attorney, Agent, or Firm* — Ohlandt, Greeley, Ruggiero & Perle, L.L.P.

(57) ABSTRACT

A coated wood board flooring having improved moisture protection, the flooring comprising: a plurality of solid wood components which together form the wood board, such that the wood board has a first surface and a second surface; and a coating substantially free of water and solvents, wherein the coating is applied to at least one of the first and second surfaces of the wood board.

6 Claims, 6 Drawing Sheets

TRAILER FLOORING WITH HOTMELT COATING

RELATED APPLICATION

This application claims priority of U.S. Provisional Application No. 60/500,195, filed Sep. 4, 2003.

FIELD OF THE INVENTION

The present invention relates to an improved laminated wood flooring for truck trailers and containers. More particularly, the wood flooring is coated with a hotmelt coating to impart superior protection to the flooring. The use of a hotmelt coating allows the production of improved flooring at high manufacturing speed, low-cost and without environmental issues.

DISCUSSION OF THE BACKGROUND ART

Conventional wood flooring for over-the-road closed van trailers, truck bodies and containers is normally manufactured with hardwoods, such as oak, maple, birch, beech, ash, etc. The green lumber used as a starting material in such manufacture is suitably dried in special drying chambers under controlled conditions. The dried lumber is then sawed into strips of rectangular cross-section and defective portions are eliminated by cross cutting the strips. During the cross-cutting process, "hooks" are formed at the ends of the lumber strips. Alternatively, other shapes such as fingers, bevel, etc., may be incorporated at the strip ends. These shapes are primarily designed to form a connection or joint between ends of strips. The relatively defect-free lumber strips are coated on their vertical sides or edges with an adhesive such as urea-melamine formaldehyde or polyvinyl acetate. The glue coated lumber strips are then assembled on a conveyor by placing them side to side and behind other strips, which were previously assembled. The adhesive is cured by applying heat and pressure to large sections of the assembled lumber strips thus forming a unitary panel. During the assembly of the lumber strips, "strip-end joints" are formed at each end of every strip with hook, finger or bevel ends. These joints are simple mechanical couplings with no significant adhesive bonding. Often times, due to imperfect assembly, a readily visible gap is formed at these strip-end joints, which can be seen from the top and bottom surfaces of the completed laminated wood floor.

The glued laminated wood is cut to a desired length (up to about 60 feet) and width (about 6 to 18 inches) to form floorboards. Most boards are 10 to 13 inches wide, and 43 to 53 feet in length. The boards are then planed to a desired thickness and shiplaps and crusher beads are machined at the longitudinal edges. A shiplap is a rectangular projecting lip running along the length at an edge of a floorboard. Typically, the lip extends along the width of a board by about ⅜" to ½" and has about half the thickness of the board. A "top shiplap" has the lip extending from the top half thickness of the board. Similarly, a "bottom shiplap" has the lip at the bottom half of the board. The crusher bead is a small semi-circular projection running along the length on each edge of a board and placed over or below a lip. When the floorboards are assembled in a trailer such that the side edges of corresponding boards are squeezed together, the top and bottom shiplaps of adjacent boards overlap to form a seam at a board or shiplap joint. The shiplap joint between adjacent boards helps to transfer some of the load from one board to its adjacent board. The board joint also helps to prevent the entry of road debris and water into the trailer. The crusher beads provide spacing between adjacent boards and help in preventing buckling of the boards due to expansion on absorption of moisture. A wood putty is applied at the strip-end joints on the top and bottom surfaces of the boards to fill any resident gaps. Finally, the underside and lateral sides of the floor boards are coated with a water-based latex polymeric coating, which is generally referred to as "undercoating" or "board coating" to provide moisture protection. The coating is usually applied by spraying. The finished floorboards are packaged as kits, by stacking one board on top of another, with about eight boards per kit for installation in trailers. Normally, a kit consists of two boards with special edge profiles so that they will fit along the road and curb sides of a trailer. The other boards may be identical in design and they are placed between the road and curb side boards. All the boards are supported by thin-walled cross-members of I, C or hat sections, each having an upper flange, which span the width of the trailer and are regularly spaced along the length of the trailer. Each floor board is secured to the cross-members by screws extending through the thicknesses of the board and the upper flanges of the cross-members.

Hardwood-based laminated wood flooring is popularly used in truck trailers since it offers many advantages. The surface characteristics of hardwoods such as high wear resistance and traction are most desirable. The strength and stiffness of the flooring is important for efficient and safe transfer of the applied loads to the cross-members of the trailer. The shock resistance of wood is useful to withstand any sudden dropping of heavy cargo on the floor. Nail holding capability and ability to absorb small amounts of water, oil or grease without significantly affecting traction are yet additional favorable properties of hardwood flooring.

Although the conventional hardwood flooring has many desirable features, it also suffers from certain disadvantages. For example, water from the roads is known to leak into trailers through the gaps of the strip-end joints that exist in the flooring. The reasons for the water leaks are believed to be the capillary action of the gaps and the tendency of the end grain of wood to absorb water. Although the undercoating is supposed to provide a barrier to the path of water, it may not properly cover larger gaps thus exposing them to moisture. Further, water based latex coating is significantly permeable to water. Wetting and drying cycles can degrade the water based undercoating leading to its cracking and peeling away from the wood. Wood expands on absorption of moisture and shrinks on drying. Continual cycles of expansion and shrinkage of boards lead to delamination of wood strips of the floor.

To alleviate the above-mentioned problems, a fiber reinforced composite wood flooring was designed, tested and refined to be an improvement over conventional wood flooring (U.S. Pat. Nos. 5,928,735; 6,183,824; and 6,179,942). This composite wood flooring consists of conventional laminated wood floorboards with an underlay of fiber reinforced plastic (FRP). The FRP layer is continuously bonded to the underside of each floorboard. The top surface of the composite wood flooring is essentially the same as that of the conventional wood flooring. Since the FRP is impervious to the passage of water, it completely seals the bottom of the floorboards and solves the problem of leaky strip-end joints. The fiber reinforcement improves the mechanical properties of the flooring and therefore the thickness of the laminated wood can be reduced. However, this approach leads to a product that is much more costly than undercoated flooring.

Alternatively, it is possible to bond a water impervious layer (U.S. Pat. Nos. 6,558,765 and 6,555,766) such as a un-filled plastic sheet or film, filled plastic, recycled plastic, parchment paper, sheet metal, melamine laminate, etc., to protect the bottom surface of floor boards. The plastic can be polyethylene, polypropylene, PVC, polyurethane, ABS, PET, PBT, etc. An adhesive including a reactive hotmelt adhesive is well suited to bond these water impervious layers to wood floorboards. However, the use of a water impervious layer can add significant cost to the product, making it more expensive than undercoated flooring. Further, the process of bonding a separate layer to floorboards is technically more sophisticated compared to the spraying of undercoating. The bonding process requires much more expensive machinery and controls. This has been successfully done to manufacture composite wood flooring using FRP for trailers and therefore other substrates can be easily substituted for the FRP (U.S. Pat. No. 6,601,357). However, this is not a low cost approach to improve water resistance of flooring.

Berube, U.S. Pat. No. 6,318,794, deals with a composite floor with fiber reinforcement at the bottom side and a polyurethane coating enveloping the entire outer surface of the floorboard. This patent also discloses a floorboard with anti-slip polyurethane coating with granular constituent on the top side of board. Polyurethane coatings and even epoxy based coatings have been used in the transportation industry for a long time as floor restorers. Essentially, leaks in the flooring of a trailer, which is in service are sealed by applying liquid polymer coatings on the topside of flooring. In these examples, the use of polyurethane and Isocyanate not only involves high cost for these materials, but also takes considerable time to cure the material by cross-linking chemical reaction to form a protective coating. The faster curing polyurethane coating such as UV-coatings are very expensive and cannot be applied as thick coatings or with coloring agents, due to limitations of UV-curing. These materials also pose chemical hazards and need to be handled with tremendous care. As such, these coatings are not used by the trailer flooring producers.

Technologists are constantly trying to find ways to improve moisture resistance of wood flooring. Fouquet, U.S. Pat. No. 5,143,418, describes the use of composite plywood panels as flooring in open platform trailers. The plywood was composed of veneers of wood with a majority of the veneers oriented with the wood grain along the longitudinal direction while the remaining veneers were oriented with the wood grain along the perpendicular direction. The top and bottom surfaces of the plywood panels were overlaid with resin impregnated cellulose sheets for providing moisture and slip resistance. Plywood based flooring is not used in van trailers due to severe structural load conditions arising from the use of lift trucks to move cargo in and out of van trailers. Further, plywood is generally not available in lengths up to 53 feet, which is preferred for trailer flooring.

Scharpf (U.S. Pat. No. 5,509,715) attempts to provide water protection to laminated wood flooring with a film such as the commercially available Tyvek that is impermeable to water, but permeable to water vapor. The film is discontinuously bonded to the underside of laminated wood boards, so that wood is able to release water vapor through the film, if the floor gets wet. In practice, water protection of the flooring from the underside is present as long as the discontinuously bonded film is not damaged by impacting gravel, rocks and road debris. Sometimes condensate water or other water from leaks in the trailer roof or open doors during rain can wet the top side of the floor. This water can enter the gaps of the hook joints or between boards and become trapped by the discontinuously bonded Tyvek undercovering. Over time, such trapped water leads to warping of the wood boards and breaking of floor screws. Therefore, this product has been discontinued by the industry.

Other techniques have been tried by the industry to eliminate water migration through the flooring from the underside. In one such attempt, a large sheet of plastic film was laid between the cross-members and floorboards. The film was wrapped around and stapled to the edges of the road-side and curb-side boards of the trailer. The film was not adhesively bonded to the boards. During road service of trailers with this type of flooring protection, water was found to enter the spaces between the bottom of the boards and the film. Water could come through the tiny openings around the floor screws. Alternatively, water could also enter from the top side of the flooring from leaks in the roof or from the doors being open in wet weather conditions. The trapped water was absorbed by the bottom side of the floorboards leading to swelling, expansion and warping. Due to these performance issues, this product design was also discontinued by the industry.

The goal of the present invention is to improve moisture protection of the bottom side of laminated floorboards at comparable cost relative to conventional water-based latex undercoating. Improved moisture protection in this case means that transfer of water in to the wood of the flooring from the bottom side, which side is exposed to road spray, would be significantly lower than that of undercoated flooring. Another objective of the invention is the method of manufacturing of the moisture resistant flooring should be as good or better than that of the undercoated flooring in terms of rate of production, simplicity of operation and ability to handle large volumes.

Conventional undercoated wood flooring with undercoating on the bottom side and exposed wood top side are not suitable for use in open platform trailers. This is because the wood top side of flooring is exposed to the environment. The glue bonds of the wood components tend to break down over time when exposed to uv-radiation and moisture. Wood itself will discolor and weaken from such exposure. Due to moisture related problems, conventional laminated flooring is also not washed with water even when used in closed van trailers. Washing of the flooring is useful after transporting certain products like nursery items, agricultural goods and some chemicals, especially, when a spill occurs. For this type of application, it is preferable to use wood flooring with greater degree of moisture protection on the top side.

The present invention does not require a costly water impervious layer, such as a plastic layer or FRP to impart moisture protection to floorboards or wood board flooring. It is also not based on conventional coatings, such as epoxy or polyurethane, that are applied as a 1-part or 2-part liquid at ambient temperature, allowed to penetrate the wood and joints and cured to form a hard surface. Further, the present invention does not use a conventional water-based or solvent-based polymer coating.

Conventional water-based latex undercoatings are simple to apply, but have several disadvantages. They do not usually bridge the gaps at the strip-end joints of the board. The coating is also not impervious to water spray from the roads. Since water can transfer in to the wood through the coating, the glue bonds between wood components of flooring can be affected over the life of the floor. The complete drying of water-based undercoating is important to prevent blocking or sticking together of the undercoated boards after these boards are stacked and banded together for shipping. Incomplete drying can lead to transfer of coating from the underside of one floorboard to the top face side of another board in contact with the coated side in a stack of boards. Such transfer of coating can not only lead to blocking, but also contaminate the top wood side of flooring.

SUMMARY OF THE INVENTION

According to the present invention, a virtually 100% solids coating material in a molten stage is applied on the floorboards or wood board flooring at high production speed. It is allowed to set or harden by cooling in less than five minutes or even in a few seconds. The 100% solids coating has substantially no water or solvents. The coating can be thermoplastic or thermosetting in nature. In the preferred embodiment, the coating is a hotmelt. The hotmelt coating is a polymeric composition, which is a solid at ambient temperature, but it softens and flows on heating so that it can be applied by roller coaters or slot-die coaters and hardens on the substrate up on cooling. This material does not need to loose water or solvents and does not need to undergo chemical reactions to set or be dry to touch. It does not need a separate layer of adhesive such as those used to bond a water impervious layer. It can continue to be a thermoplastic material even after application on floorboards. Alternatively, the hotmelt can also exhibit thermoplastic properties during application stage and then undergo a reaction with atmospheric moisture to form a thermosetting material. A reactive hotmelt is an example of such a coating that exhibits both thermoplastic and thermosetting properties at different stages. In one embodiment, the hotmelt is a nonreactive thermoplastic material. The composition of the coating can include one or more of different components from the categories of polymer, copolymer, binder, resin (tackifier and adhesion promoter), wax, elastomer, rubber, asphalt, filler, coloring agent, anti-oxidants and other additives. Polymers can be EVA (ethylene-vinyl acetate), polyamide, polyethylene, polypropylene, PVC (polyvinylchloride), polyurethane, etc. In a preferred embodiment, the polymer is a low cost material such as an EVA, polyethylene, polypropylene and PVC. It may also contain other additives to increase or lower viscosity, to promote hardness, to enhance adhesion to wood, to retard permeation of water, to increase resistance to salt water, to increase toughness and to prevent blocking.

In one embodiment, the hotmelt coating is applied on the bottom side of laminated floorboards, while the top side is uncoated. This type of flooring is suitable for most van-trailers, truck bodies and containers. If flooring needs moisture protection on the top side for washing, the top side of the flooring is coated with the hotmelt. For open platform trailers, hotmelt coating is applied at least on the top side of the floorboards and preferably on both the top and bottom sides.

DETAILED DESCRIPTION OF THE PREFERRED EMBODIMENT

Figure 1:
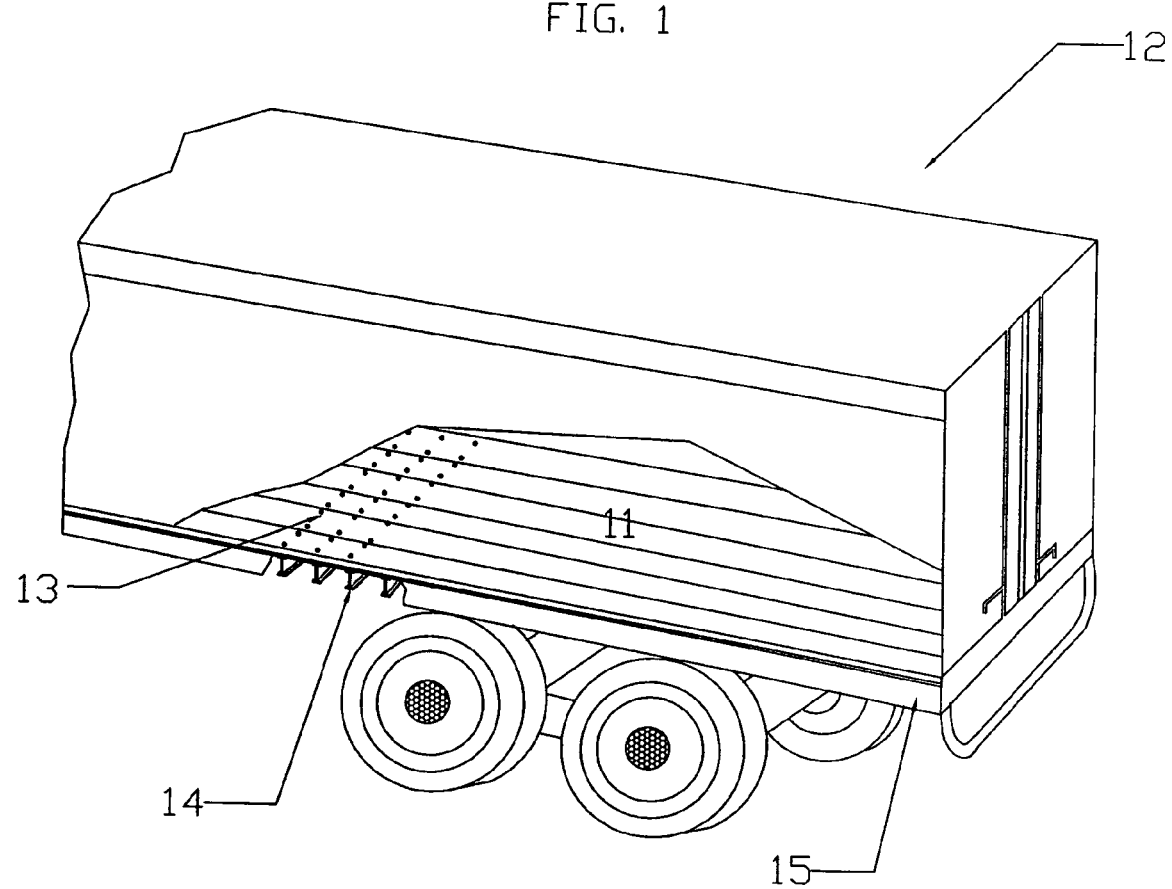
FIG. 1 is a perspective view of a van trailer showing wood flooring installed on cross-members with an I-section.
Figure 4A:
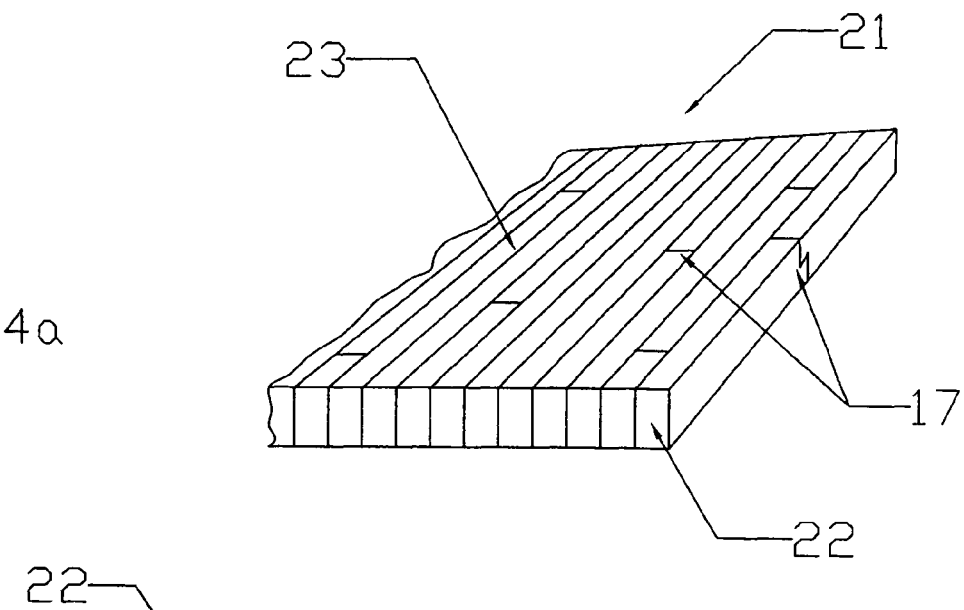
FIG. 4a is a perspective view of laminated wood with several randomly arranged hook joints.
Figure 4B:
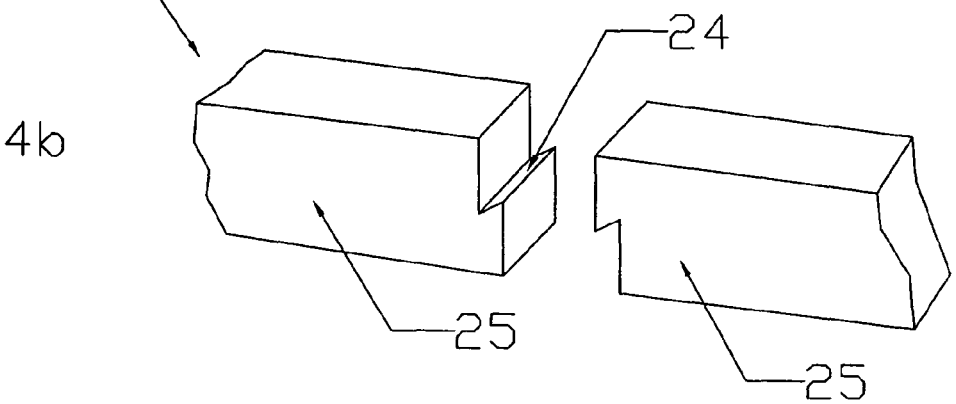
FIG. 4b is a perspective view of two opposing hooked ends of lumber strips.
Figure 4C:
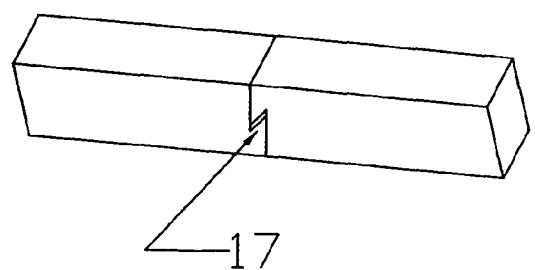
FIG. 4c is a perspective view of a perfect hook joint with little or no gap at the top and bottom sides.
Figure 4D:
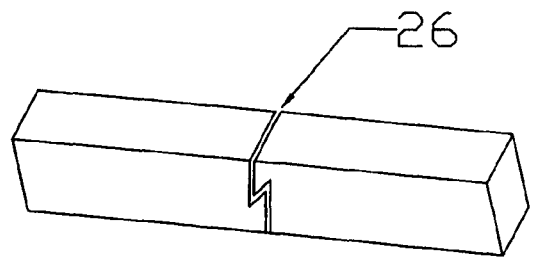
FIG. 4d is a perspective view of an imperfect hook joint with a significant gap.

Conventional wood flooring 11 for over-the-road truck trailers 12 such as that shown in FIG. 1 is normally manufactured with hardwoods such as ash, aspen, elm, yellow-poplar, and preferably oak, maple, birch, beech and the like, although softwoods such as Douglas fir and spruce could be employed. The green lumber used as a starting material in such manufacture is suitably dried in kilns under controlled conditions. The dried lumber is then sawed into strips 22 of rectangular cross-section and defective portions are eliminated by cross cutting the strips. During the cross-cutting process, "hooks" 24 are formed at the ends of the lumber strips (see FIG. 4b). Hooks are shown as an illustrative example. Alternatively, laps, fingers, bevel or other shapes could be formed at the strip ends. The relatively defect-free lumber strips are coated on their vertical sides or edges 25 with an adhesive such as urea-melamine formaldehyde or polyvinyl acetate. The uncured glue coated lumber strips are then assembled on a conveyor by placing them side to side and behind other strips, which were previously assembled, thus forming glue lines 23 between adjacent strips 22. The adhesive is cured by applying heat and edge pressure to large sections of the assembled lumber strips thus forming a unitary panel of laminated wood 21 such as that shown in FIG. 4a. During the assembly of the lumber strips, "strip-end joints" 17 are formed at each end of every strip (see FIG. 4c). These joints are simple mechanical couplings with no significant adhesive bonding. Often times, due to imperfect assembly, a readily visible gap 26 is formed at the strip-end joints, which can be seen from the top and bottom surfaces of the completed laminated wood floor (see FIG. 4d). If required, each hook joint at the ends of the lumber strips is substituted with a lap joint 30 or a finger joint 31 or a butt joint 32 or a scarf joint 33 as illustrated in FIGS. 8a to 8d.

Figure 2:
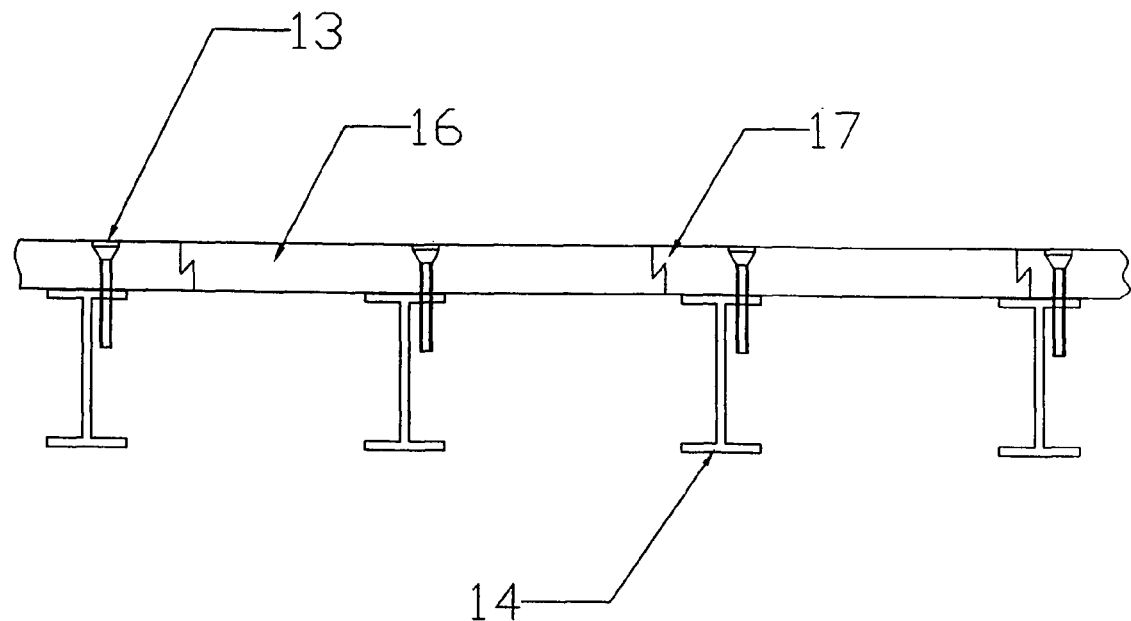
FIG. 2 is a longitudinal sectional view of a wood floorboard fastened to cross-members of an I-section.
Figure 3:
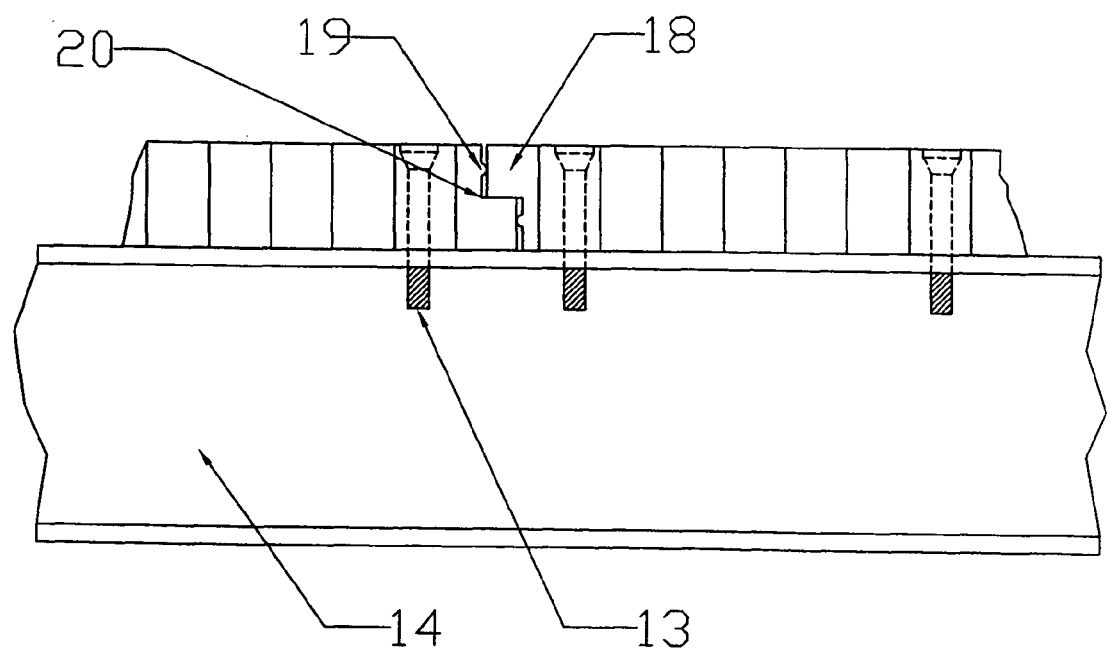
FIG. 3 is the end view of the shiplap assembly of two adjacent wood floor boards on an I-beam cross-member.
Figure 5:
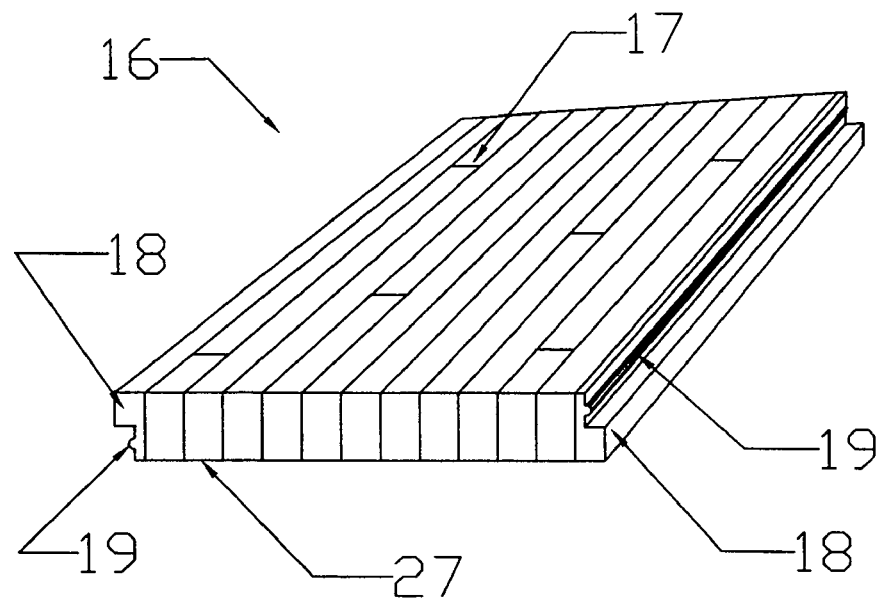
FIG. 5 is a perspective view of a conventional undercoated floorboard.

The cured laminated wood 21 is cut to a desired length (up to about 60 feet) and width (about 6 to 18 inches) and then machined to form several laminated wood boards 16 (see FIG. 5). Each laminated wood board 16 is planed to a desired thickness and shiplaps 18 and crusher beads 19 are machined on its sides. A shiplap 18 has a right-angled step with a square corner 20 formed by a rectangular projecting lip running along the length on each side of a floor board. The crusher bead 19 is a small semi-circular or another kind of projection running along the length on each side of a board and placed above or below a shiplap 18. When the floor boards are assembled in a trailer such that the side edges of corresponding boards are squeezed together, the shiplaps 18 of adjacent boards overlap to form a seam (See FIG. 3). The bead 19 provides spacing between adjacent boards and helps in preventing crushing and warping of the boards when they expand on absorbing moisture. A wood putty is applied at the hook joints 17 on the top and bottom surfaces of the boards to fill any resident gaps. Alternatively, the wood putty may be continuously coated over the top and bottom surfaces of the board while also filling the gaps of the hook joints. Finally, the underside and lateral sides including the shiplaps of the floor boards are coated by spraying a water based latex polymeric coating material termed as "undercoating" or "board coating" 27 (FIG. 5) to provide moisture protection. The finished floor boards are assembled into a kit of about eight boards for installation in trailers. Normally, a kit consists of two boards with special edge profiles so that they will fit along the road and curb sides 15, which are usually metallic components of the trailer 12. The other boards may be identical in design and they are placed between the road and curb side boards. A shiplap joint is formed between adjacent boards as shown in FIG. 3. In some trailers, a metallic component such as a hat-channel may be placed between any two adjacent boards. The metallic component becomes part of the floor area. The boards adjacent to the hat-channel have edge profiles designed to mate with the flanges of the hat-channel. All the boards are supported by thin-walled cross-members 14 of I, C or hat sections, each having an upper flange, which span the width of the trailer and are spaced along the length of the trailer. Each floor board is secured to the cross-members by screws 13 extending through the thickness of the board and the flanges of the cross-members (See FIGS. 1-3).

The water based latex undercoating is generally applied on the boards by spraying. This undercoating has a viscosity less than 2000 cps. The solids content of the coating is about 30% to 40%. The remaining non-solid part of the coating is water. The coating is designed for spraying on boards. The use of this type of coating is a standard practice in the trailer flooring industry in North America. This is due to environmental issues related to the use of solvent-based coatings and other coatings based on hazardous chemicals such as polyurethane, isocyanate and epoxy. Another reason for using water-based coating is the low cost of this coating compared to all other available coatings.

To apply the water-based latex undercoating on the floorboards, the planed floorboards are passed on a conveyor through a spray booth at speeds of about 70 to 100 feet per minute with the bottom side of board facing up. About 6 to 10 mils (wet) of undercoating is sprayed on the board. The undercoating covers the bottom side and most parts of the longitudinal edges or shiplaps of the board. The wet coating is dried by evaporating the water for about 5 to 10 minutes in heated tunnels and/or with the aid of hot air blowers. Upon drying, the coating film thickness is between 2 to 4 mils.

Figure 6:
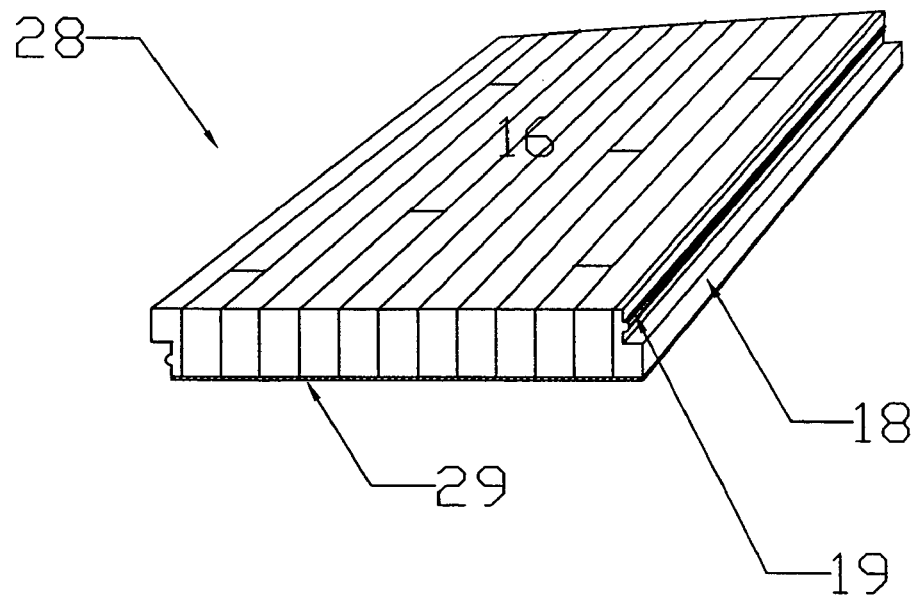
FIG. 6 is a perspective view of a hotmelt coated floorboard.
Figure 7A:
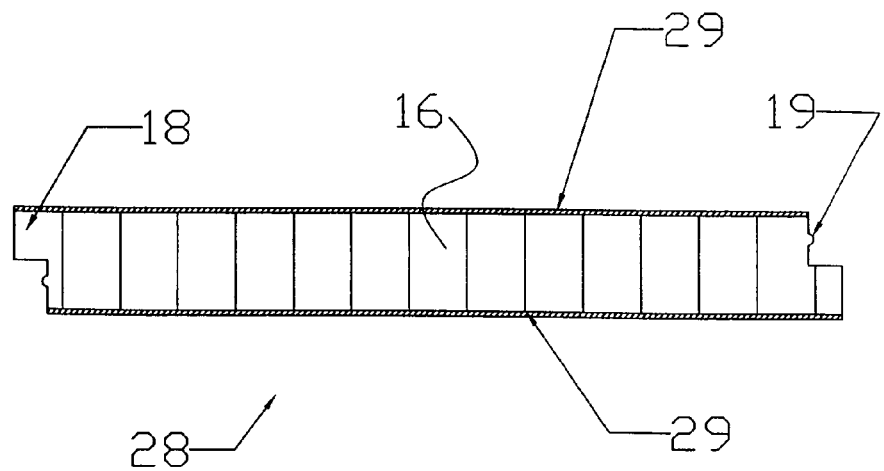
FIGS. 7a and 7b are sectional views of a hotmelt coated floorboard with different edge profiles.
Figure 7B:
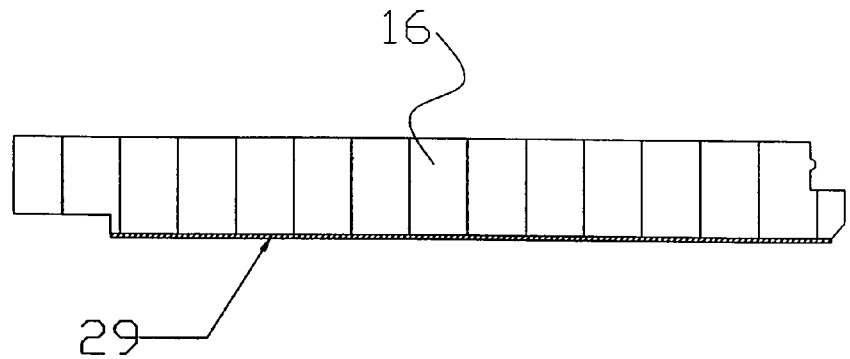
Figure 8A:
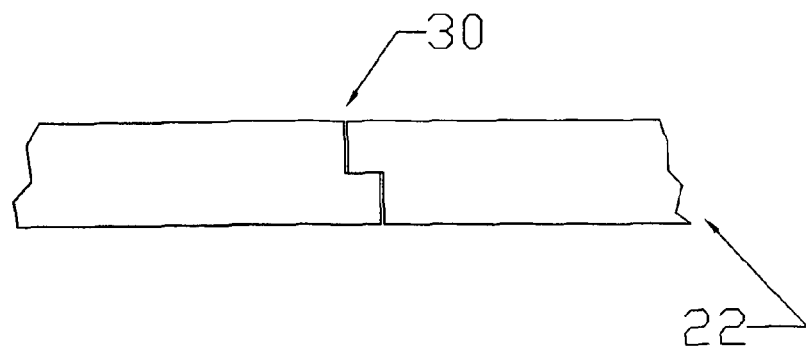
FIG. 8a shows a lap joint.
Figure 8B:
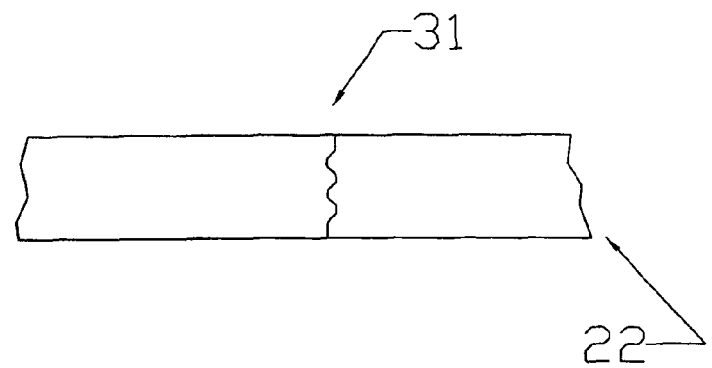
FIG. 8b shows a finger joint.
Figure 8C:
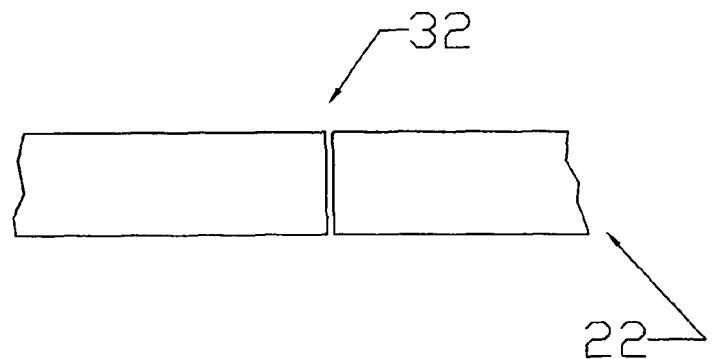
FIG. 8c. shows a butt joint.
Figure 8D:
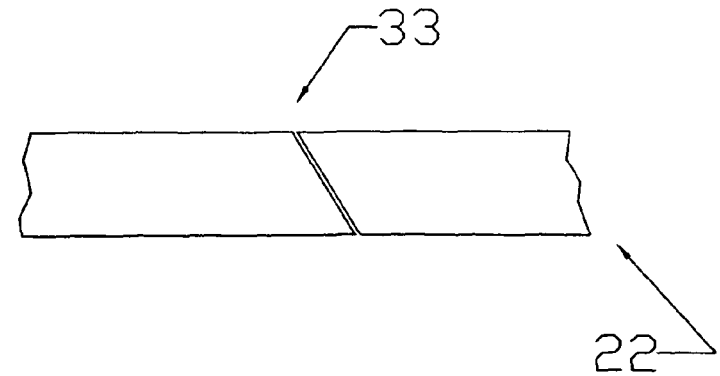
FIG. 8d. shows a scarf joint.

The hotmelt coated floor board 28 improves the above described construction of conventional undercoated floor board 16 by significantly improving moisture protection of the floor board with a fast-setting, low-cost and environmentally friendly coating 29 (as representatively shown in FIG. 6). In this invention, a virtually 100% solids coating material in a molten stage is applied on the floorboards at high production speed of 70 to 100 feet per minute. It is allowed to set or harden by cooling in less than five minutes or even in a few seconds. The 100% solids coating has substantially no water or solvents. The coating can be thermoplastic or thermosetting in nature. In the preferred embodiment, the coating is a hotmelt. The hotmelt is a polymeric composition, which is a solid at ambient temperature, but it softens and flows on heating so that it can be applied by roller coaters or slot-die coaters and hardens on the substrate up on cooling. This material does not need to loose water or solvents and does not need to undergo chemical reactions to set or be dry to touch. It does not need a separate layer of adhesive such as those used to bond a water impervious layer. It can continue to be a thermoplastic material even after application on floorboards. Alternatively, the hotmelt can also exhibit thermoplastic properties during application stage and then undergo a reaction with atmospheric moisture to form a thermosetting material. A reactive hotmelt is an example of such a coating that exhibits both thermoplastic and thermosetting properties at different stages. In one embodiment, the hotmelt is a non-reactive thermoplastic material. The composition of the coating can include one or more of different components from the categories of polymer, copolymer, binder, resin (tackifier and adhesion promoter), wax, elastomer, rubber, asphalt, filler, coloring agent, anti-oxidants and other additives. Polymers can be EVA (ethylene-vinyl acetate), polyamide, polyethylene, polypropylene, PVC, polyurethane, etc. In a preferred embodiment, the polymer is a low cost material such as an EVA, polyethylene, polypropylene and PVC. It may also contain other additives to increase or lower viscosity, to promote hardness, to enhance adhesion to wood, to retard permeation of water, to increase resistance to salt water, to increase toughness and to prevent blocking.

In one embodiment, the hotmelt coating is applied on the bottom side of laminated floorboards, while the topside is uncoated. This type of flooring is suitable for most van-trailers, truck bodies and containers. If flooring needs moisture protection on the topside for washing, the topside of the flooring is coated with the hotmelt. For open platform trailers, hotmelt coating is applied at least on the topside of the floorboards and preferably on both the top and bottom sides.

To manufacture hotmelt coated wood floor boards, the laminated wood board with shiplaps or other edge profiles is sanded or abraded on one or both major sides to improve flatness of the board. Alternatively, a knife-planed surface of the wood member can also be used. The board may have a few strips of wood, which may be too thin to be fully planed or sanded. There may also be a few knots or defects in a few wood strips of the board. One or more hotmelt roller coaters are employed to apply the coating on the board. The hotmelt is heated to about 200 to 450 degrees F. and pumped to the roller coater. The roller coater is equipped with heated rollers to keep the hotmelt in a tacky, viscous and molten stage. The viscosity of the hotmelt at the application temperature is preferably in excess of 2000 cps, and more preferably in excess of 5000 cps, which is much higher than that of water-based or other liquid sprayable coating. The floorboard is passed through the roller coater in a forward pass, wherein the direction of rotation of the coating roll is unopposed to the direction of translation of the board. About 10 to 50 grams of coating is applied in the forward pass per square foot per side of floorboard. By its nature forward pass coater creates a non-smooth or rough coating texture on the board. To smooth out the coating texture a second coating pass is made. The second pass can be made through a reverse coater, wherein the direction of rotation of the coating roll is opposed to the direction of translation of the board. This leads to a smoother coating surface. Alternatively, a second forward pass coating can be used to apply about 4 to 20 grams of hotmelt coating per square foot per side. By applying less hotmelt material, a smoother coating surface can be formed even in forward pass mode. Additional smoothening rollers can be employed to smooth out the coating texture after one single forward pass coating or any combination of forward and reverse passes. The smoothening rollers are heated rollers that spin in the forward or reverse direction compared to the direction of translation of the board. The smoothening rollers do not apply any additional hotmelt to the board, but smoothen the coating already applied. One or more smoothening rollers can be employed to improve smoothness of coating. When a non-slip surface is needed, the coating may not be smoothened by additional rollers. Depending on the type of use, the floorboard can be coated simultaneously on the topside and the bottom side or simply coated on one side only. The hotmelt is applied to form a mostly continuous coating on the board. However, some spots of the board may not get coated by the roller coater due to low strips, knots or some other defects in the wood. Any low strips, knots and defects that does not get roller coated may be coated later by a separate process with the same hotmelt or some other coating material. The lateral sides or shiplap areas and ends of boards do not lend themselves to coating with hotmelt in a roller coater. These sides may be coated by water based latex or some other sealer by conventional methods of spraying or brushing. Overspray of conventional coating over the hotmelt coating can also happen. Such overspray material can be specifically designed to match color of hotmelt and also to impart anti-block characteristics.

In an embodiment of this invention, a forward pass roller coater is used to apply hotmelt of type A on the board in the forward pass. A second reverse pass coater is used to apply hotmelt of type B. Hotmelt A can be designed for improved adhesion to the board. Hotmelt type B can be designed for improved non-blocking characteristics and smoother finish.

In another embodiment of this invention, a forward pass roller coater is used to apply hotmelt of type A on the board in the forward pass. A second forward pass coater is used to apply hotmelt of type B. The surface of the coating is further smoothened with reverse smoothening rollers.

In yet another embodiment of this invention, a forward pass roller coater is used to apply a hotmelt on the board in the forward pass. The coating is further smoothened by one or more reverse smoothening rollers.

The effectiveness of the hotmelt coating as a significant improvement over water-based coating was studied with the following experiment. Samples of floorboards of size (6" L×12" wide) with hotmelt and water-based latex coatings were prepared. Two types of hotmelt coatings (I and II) were used in this test. A commercially available water-based coating was also used for comparison. The water-based coating was sprayed on the board and allowed to dry for several days. Hotmelt coating I was applied by combination of forward coating and reverse coating. Hotmelt coating II was applied by combination of forward coating and reverse smoothening. Only the bottom side of each sample was coated with hotmelt. The remaining topside and four lateral edges of the samples were not coated by hotmelt. The topside and four lateral edges of all samples were sealed with a 2-part epoxy. Two coats of epoxy were applied to ensure a good seal. The samples were then submerged in water. The weight gain (in grams) of the samples was recorded over three days. The average results are shown below.

Absorption of Water (Grams) by Samples of Coated Boards

| Sample Type | Water soak duration | | | | |
| --- | --- | --- | --- | --- | --- |
| | 4 hrs | 8 hrs | 24 hrs | 48 hrs | 72 hrs |
| Undercoating | 8 | 11.8 | 21.5 | 33.3 | 42.3 |
| Hotmelt I | 2.5 | 3.8 | 8.8 | 16.3 | 24.5 |
| Hotmelt II | 2.8 | 2.8 | 5.5 | 8.3 | 10.5 |

Undercoated samples absorbed 42.3 grams of water, while hotmelt II coated boards absorbed only 10.5 grams of water. From the above test, it is clear that hotmelt coating provides significant improvement in performance over water-based coating for trailer flooring. Other advantages are related to manufacturing of hotmelt-coated floorboards as discussed below.

Typical thickness of water-based latex coating after drying is about 2 to 4 mils. Hotmelt coating can be easily applied in thickness up to 20 mils, if needed. If water-based coating is applied too thick (higher than 10 wet mils), it takes a very long time (more than 10 minutes) to dry the coating. Incomplete drying leads to transfer of coating to an adjacent board upon stacking of these boards. For hotmelt coating, there is no drying required. The coating simply hardens or sets by cooling. This hardening can happen in less than 30 seconds depending on the hotmelt formulation, coating thickness, etc. In general, hotmelt coated boards can be processed in a fraction of the time and with less drying space compared to water-based latex coated boards.

Water based latex coating costs about 8 $/gallon. At about 40% solid content, the cost of the solid part of the coating is about 2 $/lb. Hotmelts are commercially available at a cost as low as 1 $/lb. Therefore, the cost of the hotmelt coating is lower compared to water-based latex coating at equal thickness of dry coating. Hotmelt coating is preferably applied thicker than the water-based coating (in dry mils) for better sealing of the floorboard. This is possible because of fast setting of the hotmelt and its lower material cost. Compared to the hotmelts, conventional liquid coatings based on epoxy and polyurethane are much more expensive.

When working with water-based coating, the clean up of equipment and worker's hand washing is normally done with water and possibly some solvents. This type of clean up leads to some unavoidable run-off of contaminated water. However, for hotmelt coating, contaminated run-off can be completely avoided. It is also possible to maintain a much more cleaner factory working environment by using hotmelt coating.

The use of conventional coatings based on liquid 1-part or 2-part polyurethane, isocyanate and epoxy require the handling of hazardous chemicals. Special permits and testing may be needed before using these materials in large volumes to ensure worker safety and environmental compliance. In a preferred embodiment, the hotmelt coating of the present invention does not have such hazardous chemicals.

When using a water impervious layer, an adhesive is required to bond the layer to wood boards. Further, since the boards have varying widths (10 to 13 inches), the layer needs to be matched up in width with the board. This requires additional manufacturing steps and large inventory of layer of varying widths. In the case of hotmelt coating, the roller coater used to apply the coating can coat any width of board up to its maximum limit. There are no special procedures needed to accommodate the board width changes. This provides tremendous advantages in manufacturing, similar to the spraying of water-based latex coating.

While the invention has been described herein with reference to the specific embodiments thereof, it will be appreciated that changes, modification and variations can be made without departing from the spirit and scope of the inventive concept disclosed herein. Accordingly, it is intended to embrace all such changes, modification and variations that fall with the spirit and scope of the appended claims.

What is claimed is:

1. A coated wood board vehicular trailer and/or container flooring having improved moisture protection, said flooring comprising:

a plurality of solid, dried wood components which together form said wood board vehicular trailer and/or container flooring, such that said wood board vehicular trailer and/or container flooring comprises at least a first surface and a second surface; and a substantially water and solvent free, non-blocking hotmelt coating, wherein said coating is applied to at least one of said first and second surfaces of said wood board in a molten state at a temperature in the range between about 200 to 450° F. and a viscosity in excess of about 2000 cps, wherein said water and solvent free, non-blocking hotmelt coating solidifies and adheres to said wood board vehicular trailer and/or container flooring at ambient temperature, thereby providing said coated wood board vehicular trailer and/or container flooring without the use of an adhesive layer between said wood board vehicular trailer and/or container flooring and said substantially water and solvent free, non-blocking hotmelt coating.

2. The coated wood board of claim 1, wherein said coating contains at least one or more materials selected from the group consisting of: polymer, copolymer, binder, resin, elastomer, coloring agent, filler and wax.

3. The coated wood board of claim 2, wherein said polymer is at least one selected from the group consisting of: ethylene vinyl acetate, polyethylene, polypropylene, polyvinylchloride, polyurethane and polyamide.

4. The coated wood board of claim 1, wherein said coating is applied to said wood board by one or more roller coaters.

5. The coated wood board of claim 1, wherein said coating is applied to said wood board by one or more rollers.

6. The coated wood board of claim 1, wherein said board further comprises at least one longitudinal edge, and wherein said longitudinal edge of said board comprising a water-based latex coating.

* * * * *